(No Model.)

J. A. FURMAN.
PROCESS OF AND APPARATUS FOR MOLDING HOLLOW ARTICLES FROM CELLULOID AND OTHER COMPOUNDS OF PYROXYLINE.

No. 282,451. Patented July 31, 1883.

WITNESSES:
William D. Ellison
Herman Gustow

INVENTOR
John A. Furman
BY Chas. C. Gill
ATTORNEY

United States Patent Office.

JOHN A. FURMAN, OF NEWARK, NEW JERSEY.

PROCESS OF AND APPARATUS FOR MOLDING HOLLOW ARTICLES FROM CELLULOID AND OTHER COMPOUNDS OF PYROXYLINE.

SPECIFICATION forming part of Letters Patent No. 282,451, dated July 31, 1883.

Application filed June 12, 1883. (No model.)

*To all whom it may concern:*

Be it known that I, JOHN A. FURMAN, a citizen of the United States, and a resident of Newark, in the county of Essex and State of New Jersey, have invented certain new and useful Improvements in Processes of and Apparatus for Molding Hollow Articles from Celluloid and other Plastic Material, of which the following is a specification.

The invention relates to an improved process and apparatus for molding hollow articles from celluloid and other compounds of pyroxyline. Its particular object, when applied to such articles as pen-holders, is to produce a hollow holder having a socket at one end to receive the pen at one operation and from a single piece of material.

The invention will be fully understood from the detailed description hereinafter presented, reference being had to the accompanying drawings, in which—

Figure 1:
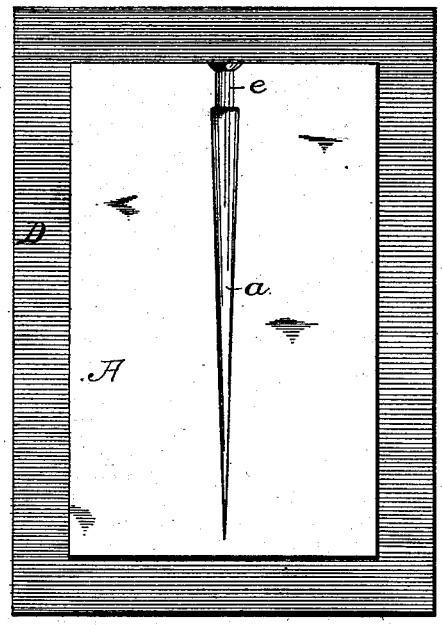
Figure 2:
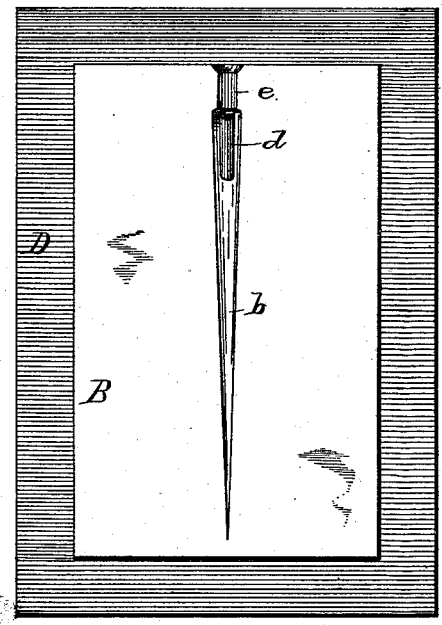
Figure 3:
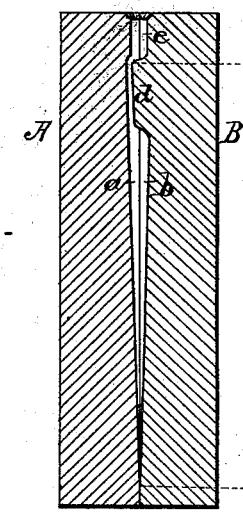
Figure 4:

Figures 1 and 2 are views of the inner face of the two halves of the die. Fig. 3 is a central vertical section of the die through the matrix. Fig. 4 is a view of the finished article.

In the drawings, A B denote the two parts of the die or mold, in which are cut the sections *a b* of the matrix, the section *a* being a plain tapering semi-cylindrical groove, while the section *b* is of exactly similar contour, except at its upper end, where it contains the elongated projection *d*, which, when the two halves of the die are in face-to-face contact, projects into the section *a* of the matrix, as indicated in Fig. 3. A gate, *e*, leads into the upper end of the matrix, as indicated. The parts of the die above described, when in use, will be set into hollow boxes D, in which a heating or cooling agent may circulate for the purpose of raising or lowering the temperature of the die, and consequently rendering plastic or "setting" the material inclosed in its matrix.

In the operation of producing a pen-holder of the kind above specified by the mold or die described, a tube of the celluloid or equivalent material is placed into or against the section *a* of the matrix, and the part of the die containing the section *b* thereof is then brought into position, the said section *b* coming against the tube of material, at the same time steam being circulated through the blocks D for the purpose of heating them and softening or rendering plastic the celluloid. The pressure applied to the opposite sides of the die causes the tube to partially conform to the outline of the matrix, its lower end being solidified therein, and its upper end being depressed on one side by the projection *d* until its said side is brought in close relation to, but is removed from, the opposite portion thereof. After the tube has attained substantially the conditions specified a cooling agent is caused to circulate in the hollow boxes D, and steam under pressure is injected through the gate *e* into the softened tube of material, which has the effect of expanding the same closely against the walls of the matrix and of continuing the expansion until the dies have become cooled by the circulation of the cooling agent in the blocks D, after which the injection of the steam through the gate *e* is stopped and the article presently removed from the die. When the tube of material is first placed into the die, its upper end will extend to about the upper edge of the gate *e*. Hence, upon the completion of the article, that portion of the material which lined the walls of the gate will be removed, leaving a finished holder formed of a single piece of material. If, during the operation of the die, a fin of the material is formed on the sides of the article, it should of course be removed.

What I claim as my invention, and desire to secure by Letters Patent, is—

1. The die or mold hereinbefore described, set in boxes to permit of its being heated or cooled, and consisting of separable parts, one containing a section of a matrix of tapering semi-cylindrical outline, the other containing a similarly-formed section having an elongated projection, substantially as and for the purpose set forth.

2. A hollow pen-holder formed from a single piece of plastic material, the side at one end of the article being partially collapsed to form a socket for the pen, substantially as set forth.

Signed at New York, in the county of New York and State of New York, this 7th day of June, A. D. 1883.

JOHN A. FURMAN.

Witnesses:
CHAS. C. GILL,
HERMAN GUSTOW.